April 13, 1937.   P. MESSINGER   2,077,051
SPECTACLE FRAME
Filed Feb. 8, 1935
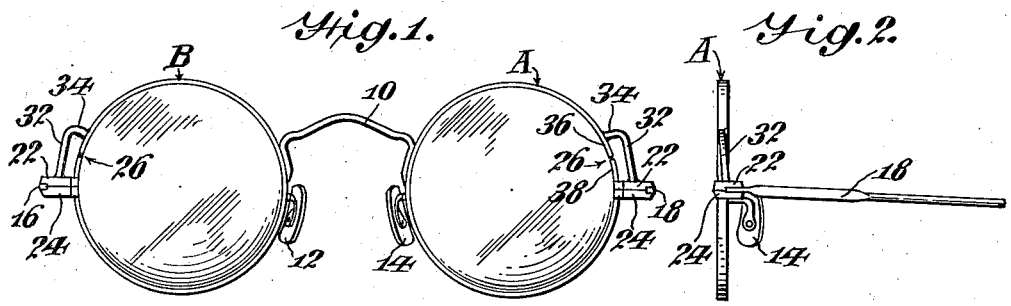
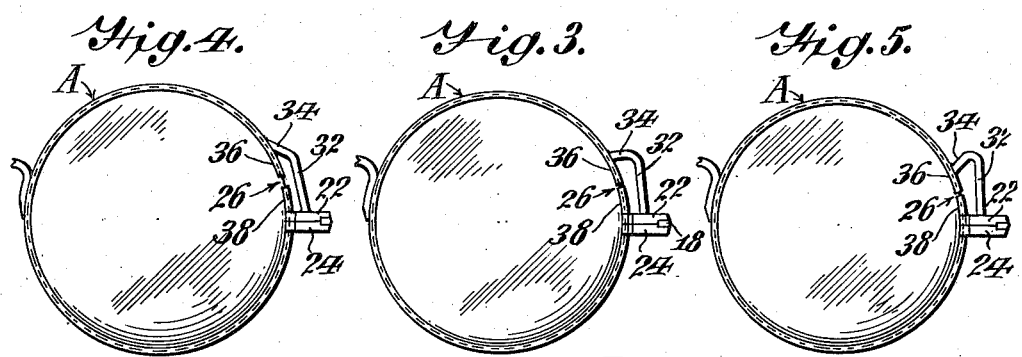
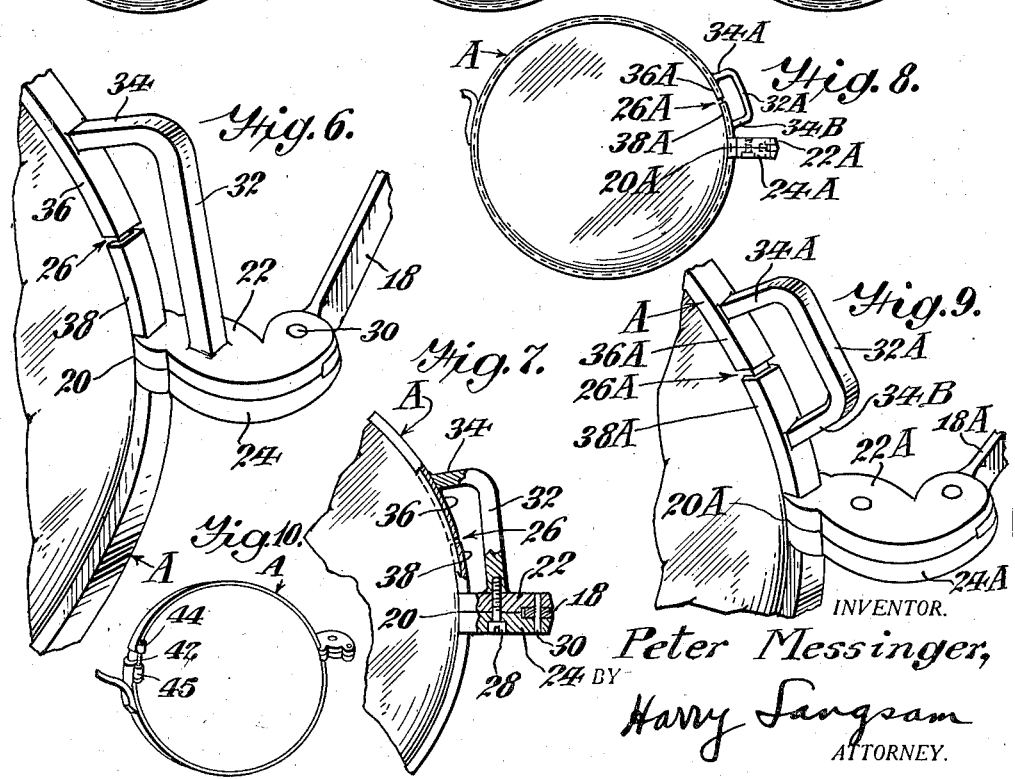
INVENTOR.
Peter Messinger,
BY Harry Sangram
ATTORNEY.

Patented Apr. 13, 1937

2,077,051

UNITED STATES PATENT OFFICE 2,077,051

SPECTACLE FRAME

Peter Messinger, Philadelphia, Pa.

Application February 8, 1935, Serial No. 5,630

3 Claims. (Cl. 88—47)

My invention relates to spectacle frames and eyeglass frames, and relates more particularly to an adjustment on the lens rim whereby the lens rim may accommodate lenses of different sizes and of different shapes.

Heretofore, lens rims have been made to a predetermined size so that if the wearer should have his glasses changed, and he desires to have a lens of larger or smaller area, then it would be necessary to have a new set of rims to accommodate the change in area since no provision was made for varying the size of the lens rim. Or in other cases, an optometrist would use only the frame of a particular size for a lens of a predetermined size since the rim could not be altered to retain a lens of a different size. In the latter case, the optometrist finds it necessary to carry a stock of frames of the same style but in different sizes. In some cases, it would be desirable to have the rims adjustable in size, so that the wearer would not find it necessary to discard his old frame if he desired to change the size of the lens, and the optometrist could increase the number of styles in the frame without increasing his stock.

It is, therefore, a purpose of my invention to construct spectacle rims which may be adjusted to retain lenses of different sizes and shapes at different times.

It is another purpose of my invention to embody in a spectacle frame an adjustment to vary the size of lens held, and which, also, is neat to enhance the attractiveness of the spectacles.

Another purpose of my invention is to construct a pair of spectacles which has an elongated holding bolt hidden from view and which does not need to be entirely removed if the lens or the temple is to be removed, and which strengthens the rim since the bolt will not readily loosen.

A further purpose of my invention is to construct an eyeglass or spectacle frame which will not chip the lens, since the lens rim will expand in the event the holding bolt is tautly drawn and the lens is slightly oversize.

Other objects of my invention are to provide an improved device of the character described of simple and economical construction possessing a maximum degree of serviceablity and of strength.

With the above and related objects in view, my invention consists in the following details of construction and combination of parts, as will hereinafter be more fully described and which will be more readily understood when read in conjunction with the accompanying drawing in which:

Fig. 1 is a front view of spectacles embodying my invention.

Fig. 2 is a side elevational view of the spectacles illustrated in Fig. 1.

Fig. 3 is a front elevational view of a lens in which the lens frame is in normal position.

Fig. 4 is a view similar to Fig. 3 except that the lens is of a larger area than the lens illustrated in Fig. 3, but the lens frame is the same.

Fig. 5 is a view similar to Fig. 3 except that the lens has a smaller area than the lens in Fig. 3 but wherein the same lens frame is employed.

Fig. 6 is an enlarged perspective view of a portion of spectacles embodying my invention.

Fig. 7 is a fragmentary sectional view of spectacles embodying my invention.

Fig. 8 is a portion of spectacles embodying a modification of my invention.

Fig. 9 is a perspective view of the modification of my invention.

Fig. 10 is a modification of the means for holding the frame adjacent the auxiliary split.

Referring now in detail to the drawing, the spectacle includes a pair of lens rims, generally designated as A and B, joined by the conventional type of bridge 10. A pair of conventional nose pads 12 and 14 support the spectacles upon the nose of the wearer and a pair of temples 16 and 18 of the conventional construction, secure the spectacle frame to the ears of the wearer. Although spectacle frames have two rims to customarily retain two lenses, but one lens rim will be described since each spectacle frame is symmetrically arranged about a vertical axis through the center of the nose bridge 10; one rim retains the right eye lens and the other rim retains the left eye lens.

The grooved lens rim A, is split as at 20, see Figs. 1 and 6, along the horizontal medial axis at the junction of the two separable temple supporting members 22, 24, and the rim is also split at 26 slightly above the temple suporting members. The lower temple supporting member 24 is of the conventional construction having a recess for the passage of a suitable long screw threaded bolt 28, the end of the recess being enlarged, as by countersinking, so that the head of the bolt 28 is entirely hidden from view. Another recess, also, enables the end of the temple to snugly fit therein either when the temple is in folded or in extended position; the temple, of course, being suitably pivoted on the shaft 30.

The upper horizontally extending temple supporting member 22 complements and abuts the lower supporting member 24 to receive the temple shaft and, also, the end of the temple. In addition, a rim adjusting member comprising an upwardly extending bar 32 has one end rigidly attached to the upper surface of the upper member 22, and the upper end 34 is inclined and rigidly attached to the portion of the rim 36 above the split 26. Another segment 38 of the rim is securely united with the upper temple member 22 and bridges the shorter space intervening between the splits 20 and 26.

A tapped bore, well illustrated in Fig. 7, in the upper supporting member 32 extends into the upwardly extending rod 32 in order to accommodate the bolt 28. The rim A is strengthened by the bolt 28 extending into the threaded bore within the rim adjusting member 32 since it will not readily loosen. The extra long bolt, also enables the horizontally extending temple supports to be separated so that the temple as well as the lens may be changed or removed without entirely removing the bolt from its threaded bore.

Hereinabove, I have described the physical embodiment of my invention, now I shall describe the changes which need be made to accommodate the rim to a lens of a new size, assuming the illustration in Fig. 3 as being the first size.

Assuming that a larger area or a different shaped lens is to be placed in the rim, the bolt 28 is loosened. The upper end 34 of the bar is inclined upwardly, as is well illustrated in Fig. 4. Such arrangement increases the length of the split 26 thereby permitting a larger lens to be carried by the rim A. After the end 34 of the rod 32 is properly adjusted to carry the new size lens the bolt 28 is tightened and the spectacles are ready to be worn. The rim adjustment member being of a spring-like nature will prevent the edge of the lens from chipping.

Now I shall assume that the lens in Fig. 3 is to be replaced by a lens of a smaller area or of a different shape, but wherein the same rim is to be employed. Again the bolt 28 is loosened so the first lens is replaced by the second lens, and then the upper end 34 of the bar is turned downwardly, as is well illustrated in Fig. 5. However, it may be necessary to remove, as by cutting, a portion of the ends of the rim adjacent the split 26. The bolt is then tightened and the spectacles are ready to be worn.

In a modification of my invention disclosed in Figs. 8 and 9, is a temple 18A held by the separable horizontally extending members 22A, 24A which define a split 20A. A frame adjustment member comprising a U-shaped member bridges a split 26A between the ends 36A and 38A of the rim A. The adjustment member which enables the rim to accommodate lenses of different sizes or of different shapes at different times is comprised of a base 32A and substantially parallel legs 34A, 34B.

In order to adjust the rim to accommodate a lens of different shape or of a different size, the holding bolt is loosened and the legs 34A, 34B are turned towards one another or away from one another depending on whether the rim is to be enlarged or to be shortened. Of course, if the rim is sufficiently shortened, it may be necessary to remove a portion of the tips 36A, 38A of the rim in order that the ends will be in alignment.

My invention may be adapted to spectacle frames of different designs and shapes, and the rim adjusting member may be made of a plurality of elements 44, 45 held together by a screw threaded bolt 42. The bolt may be fitted into two complementary threaded holes so that moving the screw expands or contracts the rim.

It is, also, within the scope of my invention to vary the shape of the adjustable member, as disclosed in Figs. 3 and 8, so that the appearance of the spectacles may be varied; and I, also, may place the split at various places, as for example, beneath the temple holding members.

The spectacles may be of metal or of synthetic material or a combination of the two stated materials and the adjustable member may be of a slightly yielding material.

Although the invention has been described in considerable detail, such description is intended as illustrative rather than limiting, as the invention may be variously embodied, and the scope of the invention is to be determined as claimed.

I claim:

1. A pair of spectacles having a split rim, a separable temple support, each end of said rim terminating respectively at said split in one of the members of said temple support, said rim being split at a second point adjacent said first split, and a bendable rod having one end connected to said rim near the end adjacent said second split farthest from said first split and the other end connected to the member of said temple support nearest said second split.

2. A pair of spectacles having a split rim, a separable temple support, each end of said rim terminating respectively at said split in one of the members of said temple support, said rim being split at a second point adjacent said first split, a bendable rod having one end connected to said rim near the end adjacent said second split farthest from said first split and the other end connected to the member of said temple support nearest said second split, said last-named member having a tapped bore extending into said bendable rod, and a screw adapted to unite the members of said temple support and extend into said bore.

3. A pair of spectacles having a split rim, a separable temple support, each end of said rim terminating respectively at said split in one of the members of said temple support, said rim being split at a second point adjacent said first split, a bendable rod connected to said rim near the end adjacent said second split farthest from said first split and to the member of said temple support nearest said second split, said last-named member having a tapped bore extending into said bendable rod, and a screw having a length greater than the thickness of the temple support and being adapted to unite the members of said temple support and extend into said bore, so that said screw need not be completely withdrawn from said bore for removal of the temple yet is hidden from view when drawn up.

PETER MESSINGER.